Figure 1:
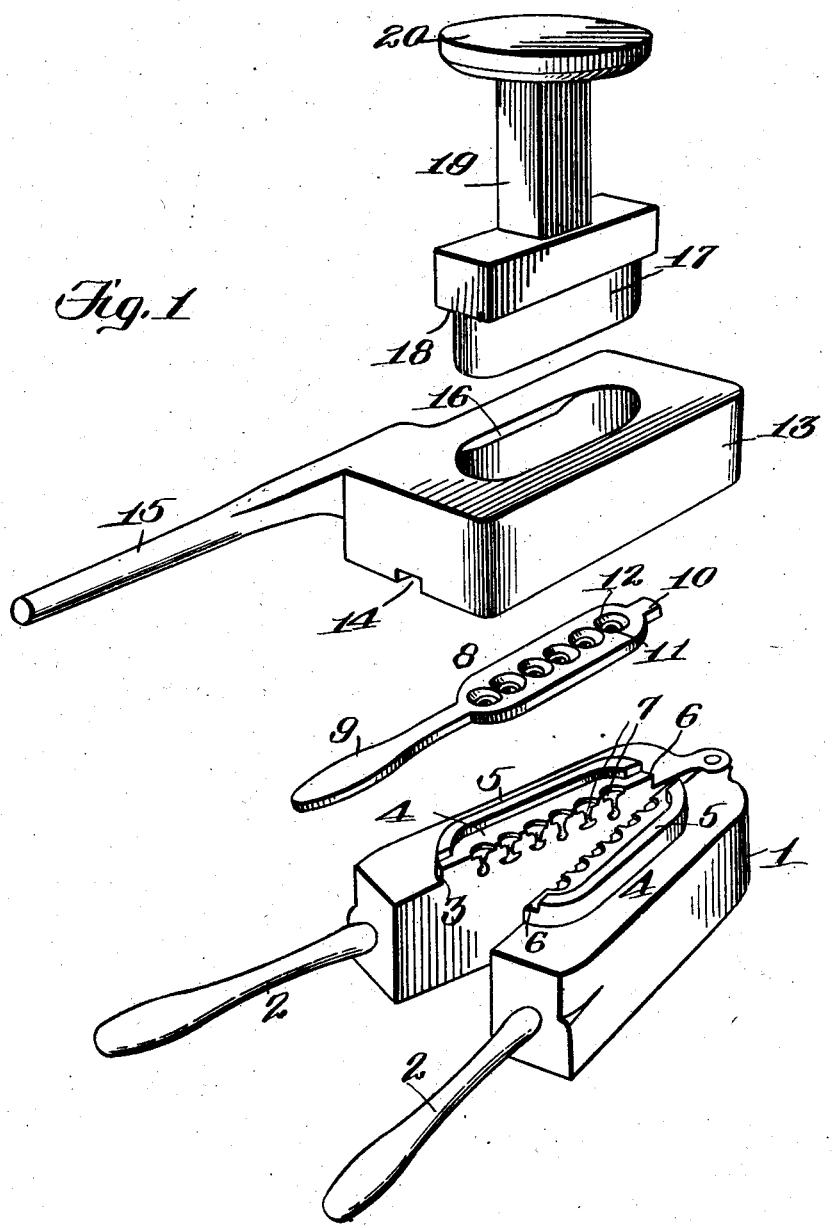

No. 729,439. PATENTED MAY 26, 1903.
J. B. STEIN.
MOLD.
APPLICATION FILED SEPT. 23, 1902.
NO MODEL. 2 SHEETS—SHEET 1.

Witnesses
Inventor
John B. Stein
By James L. Norris
Atty.

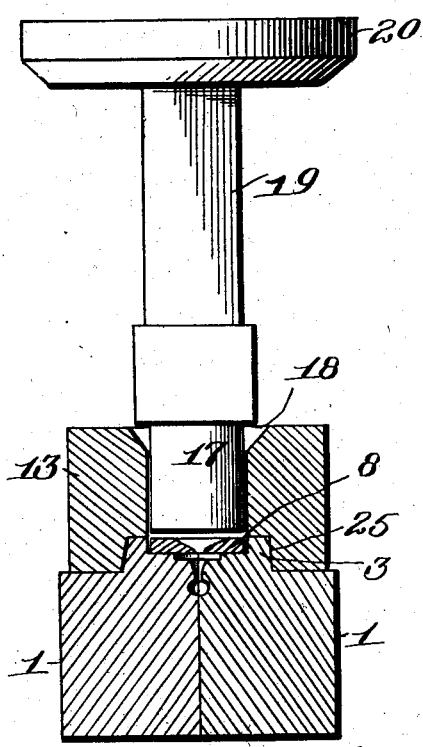
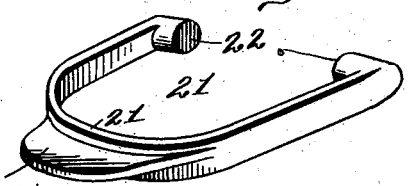
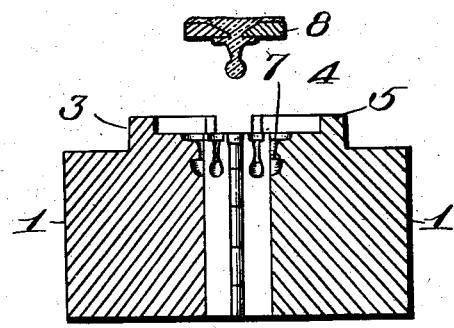
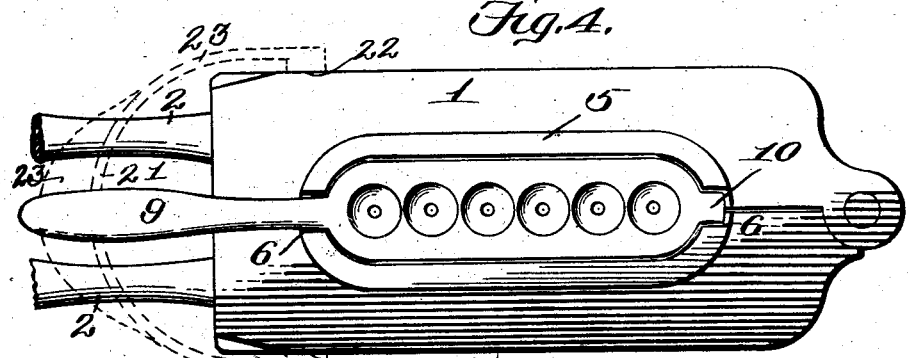

No. 729,439. Patented May 26, 1903.

UNITED STATES PATENT OFFICE.

JOHN B. STEIN, OF MORGANTOWN, WEST VIRGINIA.

MOLD.

SPECIFICATION forming part of Letters Patent No. 729,439, dated May 26, 1903.

Application filed September 23, 1902. Serial No. 124,587. (No model.)

*To all whom it may concern:*

Be it known that I, JOHN B. STEIN, a citizen of the United States, residing at Morgantown, in the county of Monongalia and State of West Virginia, have invented new and useful Improvements in Molds, of which the following is a specification.

This invention relates to molds of that kind which are particularly designed for the production of glass collar-buttons; and one object of the invention is to provide improved means for removing the molded articles from the mold after the molding operation is completed.

A further object of the invention is to provide improved means for holding the mold in closed position during the molding operation and for permitting the mold to be readily opened after the molding operation is completed for the purpose of removing the molded articles contained therein.

Other objects and advantages of the invention will be apparent from the following detail description, and the novel features of the invention will be particularly pointed out in the claims succeeding such description.

In the accompanying drawings, forming a part of this specification, Figure 1 is a perspective view of the mold, showing the various parts thereof in separate position. Fig. 2 is a vertical section of the mold with the parts thereof in closed position. Fig. 3 is a cross-section of the mold, the sections thereof being shown slightly opened and the extractor elevated slightly above the mold-sections with a molded collar-button suspended therein. Fig. 4 is a top plan view of the mold, showing the extractor seated in the recesses in the raised portions of the mold-sections. Fig. 5 illustrates a modified means of holding the mold-sections in closed position during the molding operation.

Like reference-numerals indicate like parts in the different views.

The mold 1 is separated into two longitudinal sections, which are hinged to each other at one end of the mold. At the opposite end of the mold each of the mold-sections is provided with a handle 2 for opening and closing the mold. On its upper surface the mold 1 is provided with a raised portion 3. This raised portion 3 is centrally recessed, as shown at 4, to provide the marginal flanges 5. The recess 4 is extended through the end walls of the raised portion 3 to provide the passage 6. The dividing-line of the mold extends through the center of the recess 4, and along the dividing-line are situated the die depressions 7. One-half of each of the die depressions 7 is located in the inner wall of each of the mold-sections, and the two halves of each die depression register together when the mold is closed. The die depressions 7 at their upper ends open into or communicate with the recess 4 of the raised portion 3 on the upper surface of the mold.

The reference-numeral 8 designates an extractor which is designed for the purpose of extracting the molded collar-buttons or other articles from the die depressions 7 after the molding operation is completed. This extractor 8 is provided with the handle 9 at one end and the tongue or tenon 10 at its other end. From end to end of the extractor 8 extends a series of apertures 11, which are slightly dished at their upper ends, as shown at 12. The extractor 8 fits into the recess 4 in the raised portion 3 of the mold when the mold is in closed position, and the handle 9 of the extractor passes through the passage 6 at one end of the recess 4 in the raised portion 3, while the tongue 10 of the extractor fits into the passage 6 at the other end of the recess 4.

The reference-numeral 13 indicates a mold-ring which is adapted to fit down over the raised portion 3 on the upper surface of the mold for the purpose of holding the two sections or halves of the mold in closed position during the molding operation. It will be seen that the vertical slot through the mold-ring 13 is rabbeted around the vertical slot through its center, as shown at 25, for the reception of the raised portion 3 with its flanges 5. At one of its ends the mold-ring 13 is notched on its under surface, as shown at 14, for the reception of the handle 9 of the extractor 8. It will be observed that the tongue 10 on the extractor 8 extends out flush with the end of the raised portion 3 on the upper surface of the mold. So it is not necessary to provide a notch in the mold-ring 13 for the reception of the tongue 10. The mold-ring 13 is provided with a suitable handle 15 to facilitate its removal from the raised portion 3 of the mold when it is desired to separate the halves or sections of the mold to remove the molded articles contained therein. On its upper surface around the vertical slot through its center the mold-ring 13 is preferably beveled, as shown at 16, to facilitate the introduction of the plunger, which will now be described.

In the drawings I have illustrated one form of plunger which is adapted to be used in connection with my improved mold. This plunger is provided with the plunger-head 17, having the shoulder 18, adapted to abut against the upper surface of the mold-ring when the plunger is fully depressed. It is also provided with the shank 19 and the crown-piece 20.

The operation of my improved mold is as follows: The two halves or sections of the mold are first brought together, and the extractor 8 is placed in the recess 4 of the raised portion 3 on the upper surface of the mold. The mold-ring 13 is then fitted down over the raised portion 3 of the mold so that the handle 9 of the extractor 8 passes through the notch 14 in the mold-ring 13. Molten glass is then introduced through the central slot of the mold-ring 13 and allowed to flow through the apertures 11 of the extractor 8 into the die depressions of the mold. The mold is then introduced beneath the plunger-head 17 of the plunger, (which may be operated by an ordinary glass-press,) and the plunger is allowed to descend into the vertical slot through the mold-ring 13. This action of the plunger effectually forces the molten glass into the die depressions of the mold. The plunger is then withdrawn from the slot of the mold-ring, and the mold-ring is removed from the raised portions 3 of the mold. The two halves or sections of the mold are then separated by means of the handles 2, and the extractor 8 is removed by giving the handle 9 a sidewise movement to loosen the molded collar-buttons from the die depressions of the mold. It will be found that the collar-buttons are all attached to the extractor 8 by small nibs of glass, which extend through the dished apertures of the extractor. The molded collar-buttons are easily and quickly removed from the extractor by striking them with any suitable instrument, which causes the small nibs of glass that extend through the extractor to break and release the buttons from the extractor. It is now only necessary to file or smooth off the small rough projecting portion which is left on the base of each collar-button by the breaking of the glass nib which extends through the extractor.

In Fig. 5 of the drawings I have illustrated an additional means of clamping the mold-sections together during the molding operation. This additional clamping means consists of the approximately U-shaped clip 21, provided with the bearing or contacting ends 22 22 and the enlarged or grip portion 23. In using this clip 21 the mold-sections are closed together, and the bearing ends of the clip are applied to the opposite sides of the mold, as shown by the dotted lines in Fig. 4, the enlarged or grip portion of the clip being supported by the handle 2 of the mold. It will be observed that the opposite sides of the mold are slightly beveled at the points where the bearing ends 22 22 of the clip 21 rest when said clip is applied to the mold to facilitate the application of the clip to the mold.

The clip 21 is adapted to aid the mold-ring 13 in holding the mold-sections closed during the molding operation against any strain which may result from the descent of the plunger and the consequent pressure of glass within the die depressions of the mold. It is also adapted to hold the mold-sections in closed position before the mold-ring is applied to the mold and while the extractor is being placed within the recess in the raised portion of the mold. It is further adapted to take the place of the key usually employed with molds of this character for holding the mold-sections in closed position.

It will be understood, of course, that any number of die depressions may be employed in the mold and that these die depressions may have any desired form to correspond with the shapes of the different collar-buttons which it is desired to produce. In the drawings I have illustrated a number of different forms of die depressions. It will also be understood that the mold may be made double without departing from the spirit of my invention. Nor do I desire to be limited to any particular material from which the collar-buttons or other articles are to be molded nor to any particular kind of glass, for I contemplate molding collar-buttons from glass of various different colors.

Having described my invention, what I claim as new, and desire to secure by Letters Patent, is—

1. The combination with a sectional mold having a raised portion thereon and a plurality of die depressions therein, an extractor provided with a plurality of apertures registering with said die depressions and having a handle, and a mold-ring fitted over said raised portion and said extractor and having a cut-away portion to receive the handle of said extractor.

2. The combination with the sections of a divided mold, provided with raised portions on the upper surfaces thereof, said raised portions having recesses therein, and a plurality of die depressions opening into said recesses, of an extractor adapted to fit into said recesses, said extractor having a plurality of apertures adapted to register with said die depressions, and a mold-ring adapted to fit over the raised portions of said mold-sections, and having a vertical slot adapted to receive a plunger.

3. The combination with the sections of a divided mold having a recess in its upper surface, and having a plurality of die depressions opening into said recess, of an extractor fitted into said recess, said extractor having a handle that projects through a cutaway portion in the upper surface of said mold and having a plurality of apertures therein that register with said die depressions.

In testimony whereof I have hereunto set my hand in presence of two subscribing witnesses.

JOHN B. STEIN.

Witnesses:
CHAS. S. SHAFFER,
BOYCE W. REYNOLDS.